Figure 1:
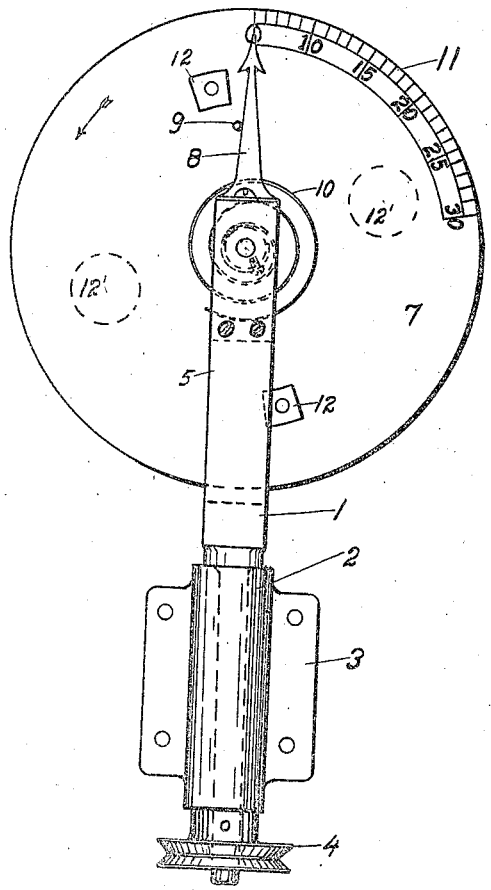

H. H. WELCH.
SPEED INDICATOR.
APPLICATION FILED AUG. 13, 1910.

1,084,587.

Patented Jan. 13, 1914.

WITNESSES
N. P. Peare
A. S. Phillips

INVENTOR
Horace H. Welch
by Clarence R. Chamberlain

UNITED STATES PATENT OFFICE.

HORACE H. WELCH, OF CHICAGO, ILLINOIS, ASSIGNOR TO STEWART-WARNER SPEEDOMETER CORPORATION, OF CHICAGO, ILLINOIS, A CORPORATION OF VIRGINIA.

SPEED-INDICATOR.

1,084,587.   Specification of Letters Patent.   Patented Jan. 13, 1914.

Application filed August 13, 1910.   Serial No. 577,044.

*To all whom it may concern:*

Be it known that I, HORACE H. WELCH, a citizen of the United States, residing at the city of Chicago, in the county of Cook and State of Illinois, have invented a new and useful Improvement in Speed-Indicators, of which the following is a specification.

My invention relates to speed indicating devices of the class which are applied to moving machines or machinery having moving parts, whereby the successive or different speeds thereof are visually indicated.

The speed indicators in general use involve two separately moving mechanisms, one which is actuated directly by the machine itself, whose speed is to be indicated, and a second and relatively independent mechanism which constitutes the indicating device. The actuating relation between the two is ordinarily established by a cam or frictional means or, as has been done, by the use of a magnetic field. But with such a connection the relation of the indicating to the moving mechanism is relative and never wholly responsive until after an appreciable interval of time the proper relation between the parts is established. In other words, the indicator is not immediately responsive to changes in speed. Moreover, dials upon which the indication of speed takes place are visible only from one general direction.

It is the object of my invention to provide a speed indicator which utilizes the well known facts of the persistence of vision to exhibit the scale reading to the observer while the device is in rapid rotation, thus doing away with the objectionable connection between the several parts of ordinary speedometers; and also to provide a speed indicator which is visible from all directions.

The principles of my invention are illustrated in the drawings, in which—

Figure 2:
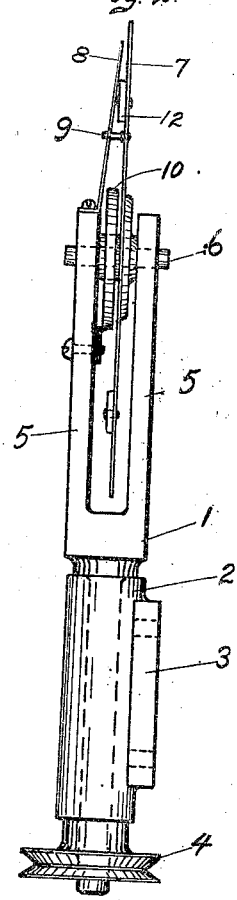

Figure 1 shows a front elevation of my device, and Fig. 2 a side view of the same.

Further describing my invention with reference to the drawings, 1 is a spindle vertically placed and journaled in the bearing 2, which may be attached by means of the bracket 3 to any stationary or convenient support. On the lower end of the said spindle is a pulley 4 by which the motion of the mechanism, whose speed is to be determined, may be communicated and by which the spindle is rotated at all times in direct proportion to the speed of such mechanism. The manner in which this is done is immaterial, but may be by the means shown, or any other suitable device. The upper portion of the spindle 1 has bifurcations 5 within which, upon the pivot 6, is mounted a disk 7 of uniform thickness. A pointer 8, stationary with reference to its support, may be secured on one of the extensions of the spindle. A stud 9 is attached to the disk and bears against the pointer in which position it should be lightly held by the stress of a spring 10, one end of which is secured to the spindle and the other to the disk. The edge of the disk is graduated at 11 from the zero point determined by the pointer and the stop bearing thereagainst. The disk 7 should further be provided with weights 12 placed slightly off the central line of the spindle and opposite to the graduated edge of the disk. When the spindle is revolved the turning moment due to the weights 12 will be exerted to turn the disk 11 in the direction of the arrow, and this turning moment will be continued, thereby overcoming the resisting moment of the spring 10 in proportion to the speed at which the device is rotated. It is evident that the unequal balance of the disk upon which the centrifugal force may act may be obtained by other means than the weights 12, as, for instance, by lightening the disk by removing portions thereof as indicated by the dotted lines 12'. In either case a centrifugally acting balance is provided which, when the device is rotated, overcomes any counterforce which would tend to hold the disk in the zero position. Such construction or any other one adapted to bring about the said result is to be considered as the mechanical equivalent of the weights 12. Between the two forces thus balanced, every variation of speed of the moving mechanism will cause an instant and accurate corresponding movement of the disk with reference to the relatively stationary pointer. When the revolution is sufficiently rapid it will produce the effect of persistence of vision in the spectator, thus enabling the scale to be clearly read. And it is apparent that the position of the spectator is immaterial for the effect is the same in all directions.

I claim:

1. In a speedometer; a display disk provided with indicative characters, means for normally holding said disk so that the zero character thereon is at the display position, and means for rotating said disk whereby said characters are moved selectively to the display position and presented to the eye in rapidly succeeding intervals of time by a series of non-continuous visual impressions.

2. In a speedometer; the combination of a rotatable spindle, a graduated disk pivoted thereon and provided with indicative characters, means for causing the disk normally to assume a position to display the zero character, a centrifugally actuated counterbalancing device for said disk, and means adapted to be driven by the mechanism whose speed is to be measured for rotating said spindle.

3. In a speedometer; the combination of a rotatable spindle, a graduated disk pivoted thereon and provided with indicative characters, a spring device for causing the disk normally to assume a position to display the zero character, a centrifugal counterbalancing device for said disk, and means adapted to be driven by the mechanism whose speed is to be measured for rotating said spindle to actuate the counterbalancing device.

4. In a speedometer; the combination of a rotatable bifurcated spindle, a graduated disk pivoted between the bifurcations of said spindle, an indicator which is stationary relatively to the disk, means actuated by the spindle for rotating the disk so that the graduations thereon are placed selectively opposite said indicator, and means driven by the mechanism whose speed is to be measured to rotate the said spindle.

In witness whereof, I have hereunto set my hand, this 11th day of August A. D. 1910, in the presence of two subscribing witnesses.

HORACE H. WELCH.

Witnesses:
H. P. Teare,
A. S. Phillips.